United States Patent
Kim

(10) Patent No.: US 8,968,934 B2
(45) Date of Patent: Mar. 3, 2015

(54) ELECTRODE FOR SECONDARY BATTERY, FABRICATION METHOD THEREOF, AND SECONDARY BATTERY COMPRISING SAME

(75) Inventor: Il Doo Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 648 days.

(21) Appl. No.: 12/578,096

(22) Filed: Oct. 13, 2009

(65) Prior Publication Data

US 2010/0092866 A1 Apr. 15, 2010

(30) Foreign Application Priority Data

Oct. 15, 2008 (KR) ........................ 10-2008-0101350

(51) Int. Cl.
| | | |
|---|---|---|
| H01M 4/04 | (2006.01) | |
| H01M 4/48 | (2010.01) | |
| H01M 4/1391 | (2010.01) | |
| H01M 4/131 | (2010.01) | |
| H01M 4/485 | (2010.01) | |
| H01M 4/505 | (2010.01) | |
| H01M 4/525 | (2010.01) | |
| H01M 4/58 | (2010.01) | |
| H01M 4/02 | (2006.01) | |

(52) U.S. Cl.
CPC .......... *H01M 4/1391* (2013.01); *H01M 4/0419* (2013.01); *H01M 4/0471* (2013.01); *H01M 4/131* (2013.01); H01M 4/043 (2013.01); H01M 4/485 (2013.01); H01M 4/505 (2013.01); H01M 4/525 (2013.01); H01M 4/5825 (2013.01); H01M 2004/021 (2013.01); Y02E 60/122 (2013.01)
USPC .................................... 429/231.6; 429/218.1

(58) Field of Classification Search
USPC .......................................... 429/218.1, 231.6
See application file for complete search history.

(56) References Cited

U.S. PATENT DOCUMENTS

| | | | | |
|---|---|---|---|---|
| 5,510,212 | A * | 4/1996 | Delnick et al. | 429/231.4 |
| 5,922,491 | A * | 7/1999 | Ikawa et al. | 358/1.15 |
| 6,682,849 | B2 * | 1/2004 | Narang et al. | 429/218.1 |
| 6,908,706 | B2 | 6/2005 | Choi et al. | |
| 7,547,490 | B2 * | 6/2009 | Spitler et al. | 429/231.1 |
| 7,976,975 | B2 | 7/2011 | Ajiki | |
| 8,034,485 | B2 * | 10/2011 | Dahn et al. | 429/221 |
| 8,048,567 | B2 * | 11/2011 | Kim et al. | 429/231.5 |
| 8,124,266 | B2 * | 2/2012 | Yamazaki | 429/120 |
| 8,241,525 | B2 | 8/2012 | Oki et al. | |
| 2008/0057355 | A1 | 3/2008 | Ajiki | |
| 2010/0230641 | A1 | 9/2010 | Oki et al. | |

FOREIGN PATENT DOCUMENTS

| | | |
|---|---|---|
| JP | 2002-319400 A | 10/2002 |
| JP | 2005/525674 A | 8/2005 |
| JP | 2006-172995 A | 6/2006 |
| JP | 2008-034378 A | 2/2008 |
| JP | 2008-066042 A | 3/2008 |
| WO | 03/012908 A2 | 2/2003 |
| WO | 2008/001792 A1 | 1/2008 |

OTHER PUBLICATIONS

Kim, D.W., "Highly Conductive Coaxial SnO2—InsO3 Heterostructured Nanowires for Li Ion Battery Electrodes," Nano Letters, 7:10, 2007, 3041-3045.
Lou, X. W., "Template-Free Synthesis of SnO2 Hollow Nanostructures with High Lithium Storage Capacity," Adv. Materials, 2006, 18, 2325-2329.
Ying, Z., et al., "Characterization of SnO2 nanowires as an anode material for Li-ion batteries," Applied Physics Letters, 87, 2005, 113108.

* cited by examiner

*Primary Examiner* — Stuart Hendrickson
(74) *Attorney, Agent, or Firm* — Ladas & Parry LLP

(57) ABSTRACT

The present invention relates to an electrode for a secondary battery, comprising a collector and a porous electrode active material layer disposed on at least one surface of the collector by spraying metal oxide nanoparticle dispersion, wherein the porous electrode active material comprises one selected from the group consisting of aggregated metal oxide nanoparticles, metal oxide nanoparticles and a mixture thereof, which is capable of undergoing stable high speed charging/discharging cycles under a high-energy-density and high-current condition.

18 Claims, 12 Drawing Sheets

ELECTRODE FOR SECONDARY BATTERY, FABRICATION METHOD THEREOF, AND SECONDARY BATTERY COMPRISING SAME

FIELD OF THE INVENTION

The present invention relates to an electrode for a secondary battery having excellent performance characteristics in terms of long-lasting high current output during repeated charging/discharging cycles, a fabrication method thereof, and a secondary battery comprising same.

BACKGROUND OF THE INVENTION

A secondary battery has been used as a source of power supply for portable devices such as mobile phones, digital cameras, PDAs, and notebooks. With the increasing global awareness of the problems associated with the depletion of petroleum resources and global warming, the demand for middle or large size-secondary batteries applicable to hybrid electric vehicles (HEVs), electric tools, electric motorcycles, robot industries, and others has sharply increased. In order to satisfy such demand, there is a need for developing an environment-friendly battery having a high output (high C-rate characteristics), high energy density, and excellent stability during repeated charging and discharging cycles.

In general, a secondary battery is composed of a cathode, an anode, an electrolyte, and a separator, and it converts a chemical energy into an electrical energy through the reaction of lithium ions reversibly intercalated between the cathode and the anode. Especially, the active materials constituting the electrodes, the positive active material and the negative active material, are the most important factors that influence the battery performance characteristics.

A carbon material has been generally used for preparing a negative active material. However, the carbon material currently commercialized (e.g., graphite) only allows, in theory, the intercalation of one lithium per 6 carbon atoms ($LiC_6$), which gives a theoretical maximum capacity of only 372 mAh/g.

In order to overcome such capacity limitation to achieve a higher energy density, extensive studies on tin oxide, transition metal oxide-based materials, lithium, lithium alloys, carbon composite materials, and silicon-based negative active materials have been conducted. A silicon-based negative active material has a theoretical maximum capacity of 4200 mAh/g, which is 10-fold higher than that of a graphite-based negative active material. Further, tin oxide also has a high theoretical capacity of at least 700 mAh/g, but it undergoes an unacceptably large volume change (~300%) during the charging/discharging cycles, which causes its separation from the electrode, making it difficult to maintain a sustained battery cycle performance.

In order to minimize the internal stress caused by such volume change, studies on modifying the surface of a negative active material or using fine nano-meter sized nanostructures (e.g., nanoparticles and nanowires) have been conducted. Such nanostructures include a hollow $SnO_2$ ball structure [Advanced Materials, Vol. 18, 2325 (2006)], a $SnO_2$ nanowire structure [Applied Physics Letters, Vol. 87, 113108 (2005)], and a $SnO_2$—$In_2O_3$ composite nanostructure [Nano Letters, Vol 7, 3041 (2007)]. However, even in case of using such nanostructures as a negative active material, 30% discharge capacity decay has been observed after 10 cycles.

Further, there have been carried out a number of studies on a composite-typed negative active material composed of a graphite-based negative active material mixed with a silicon-based and tin oxide-based negative active materials, but as the content of the graphite-based material increases, the capacity decay becomes unacceptably high.

Example of transition metal oxides used as a positive active material are $V_2O_5$, $CuV_2O_6$, $NaMnO_2$, $NaFeO_2$, $LiCoO_2$, $LiNiO_2$, $LiNi_{1-y}Co_yO_2$ ($0 \leq y \leq 0.85$), $LiMn_2O_4$, $Li[Ni_{1/2}Mn_{1/2}]O_2$, $LiFePO_4$, and transition metal oxides doped with 1 atom % or less of $Mg^{2+}$, $Al^{3+}$, $Ti^{4+}$, $Zr^{4+}$, $Nb^{5+}$, or $W^{6+}$ in the lithium sites of $LiFePO_4$, and the above-mentioned positive active materials may be used in the form of a composite in order to enhance the high-output and high-capacity characteristics.

Also, a negative active material and a positive active material are applied on a collector using various methods such as screen printing, spin coating, and vacuum deposition, but there is a need for developing a specific, low-cost coating technology that does not require the use of binders or additives and can be applied to create a large area having a broad range of thickness.

SUMMARY OF THE INVENTION

Accordingly, it is an object of the present invention to provide an electrode for a secondary battery having improved performance characteristics in terms of high energy density, high speed charging/discharging capability, and high-capacity/high-output capabilities.

It is another object of the present invention to provide a simple, low-cost fabrication method of the electrode for a secondary battery.

It is a further object of the present invention to provide a secondary battery comprising the electrode and having excellent performance characteristics achieved by minimizing volume expansion/contraction of the negative active material during repeated charging/discharging cycles.

In accordance with an aspect of the present invention, there is provided an electrode for a secondary battery comprising: a collector and a porous electrode active material layer disposed on at least one surface of the collector by spraying metal oxide nanoparticle dispersion, wherein the porous electrode active material comprises one selected from the group consisting of aggregated metal oxide nanoparticles, metal oxide nanoparticles, and a mixture thereof.

In accordance with another aspect of the present invention, there is also provided a fabrication method of the electrode for a secondary battery comprising the steps of: preparing a metal oxide nanoparticle dispersion by dispersing one or more types of metal oxide nanoparticles in a solvent; spraying the metal oxide nanoparticle dispersion on the collector under an applied electric field to form a metal oxide thin layer on the collector; and thermal-treating the metal oxide thin layer to obtain the porous electrode active material layer comprising one selected from the group consisting of aggregated metal oxide nanoparticles, metal oxide nanoparticles and a mixture thereof.

In accordance with a further aspect of the present invention, there is further provided a secondary battery comprising an anode, a cathode, and an electrolyte, wherein at least one of the anode and cathode is the electrode for a secondary battery.

BRIEF DESCRIPTION OF THE DRAWINGS

The above and other objects and features of the present invention will become apparent from the following description of the invention taken in conjunction with the following accompanying drawings, which respectively show.

DETAILED DESCRIPTION OF THE INVENTION

Figure 1:
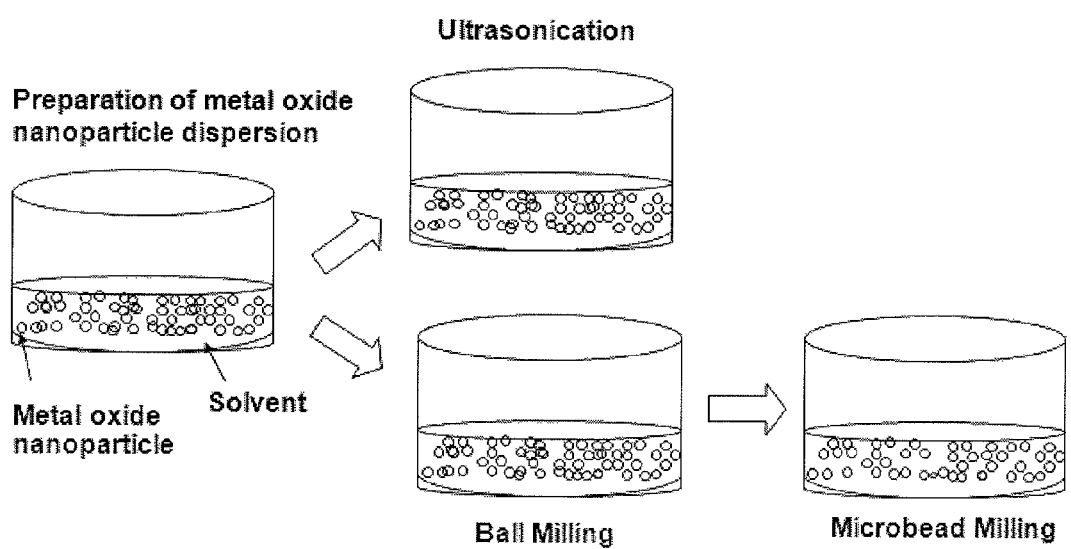
FIG. 1 is a schematic view illustrating the preparation process of a dispersion containing metal oxide nanoparticles according to the present invention.

The electrode for a secondary battery according to the present invention comprises a collector and a porous electrode active material layer formed on at least one surface of the collector by spraying metal oxide nanoparticle dispersion, wherein the porous electrode active material comprises one selected from the group consisting of aggregated metal oxide nanoparticles, metal oxide nanoparticles, and a mixture thereof.

The average diameter of the aggregated metal oxide nanoparticles is 200 nm to 2 μm and the average diameter of the metal oxide nanoparticles is 2 to 200 nm.

The collector may include (a) a metallic material selected from the group consisting of Pt, Au, Pd, Ir, Ag, Rh, Ru, Ni, stainless steel, Al, Mo, Cr, Cu, Ti, and W, (b) ITO (In doped $SnO_2$) and FTO (F doped $SnO_2$), and (c) a metal formed on the surface of a silicon wafer.

The porous electrode active material layer is disposed on the collector in a particle-state by spraying under an applied electric field without the necessity of an extra binder, and comprises at least one component of metal oxide nanoparticles. The porous electrode active material layer has the closest laminated structure with metal oxide nanoparticles. For this, by spraying (e.g., electrospraying) to uniformly form a thin layer of metal oxide nanoparticles on a collector, and by post-heating treatment to increase the bond between dispersed nanoparticles and the adhesion with the collector, a porous electrode active material layer having high mechanical, electrical stabilities is obtained. Further, for an additional closest packing, the electrode active material layer can be thermally compressed after spraying to raise a packing ratio of nanoparticles, thereby also raising the density of an electrode active material layer. For a stable spraying, the metal oxide nanoparticle having the average size of 2 to 1000 nm, preferably 2 to 200 nm, more preferably 2 to 100 nm can be used.

If the electrode active material layer is a negative active material layer, the metal oxide is selected from the group consisting of $SnO_2$, $TiO_2$, $Fe_2O_3$, $Fe_3O_4$, CoO, $CO_3O_4$, CaO, MgO, CuO, ZnO, $In_2O_3$, NiO, $MoO_3$, $WO_3$, $Li_4Ti_5O_{12}$, $SnSiO_3$, and a mixture thereof, which, however, does not limit the scope of the present invention.

Further, if the electrode active material layer is a positive active material layer, the metal oxide is selected from the group consisting of (a) $V_2O_5$, $CuV_2O_6$, $NaMnO_2$, $NaFeO_2$, $LiCoO_2$, $LiNiO_2$, $LiNi_{1-y}CO_yO_2$ (0≤y≤0.85), $LiMn_2O_4$, $Li[Ni_{1/2}Mn_{1/2}]O_2$, $LiFePO_4$, and a mixture thereof, (b) $LiFePO_4$ doped with 1 atom % or less of at least one selected from the group consisting of $Mg^{2+}$, $Al^{3+}$, $Ti^{4+}$, $Zr^{4+}$, $Nb^{5+}$, and $W^{6+}$ which occupy the lithium sites of $LiFePO_4$, and (c) a mixture of (a) and (b) can be used as the metal oxide, however, the present invention is not limited to the above.

In addition, the present invention provides a secondary battery comprising an anode, a cathode, and an electrolyte, wherein at least one of the anode and cathode is the electrode for a secondary battery.

Here, the anode may have the above-mentioned negative active material layer, and the cathode may have the above-mentioned positive active material layer.

The present invention also provides a fabrication method of the electrode for a secondary battery.

The fabrication method is divided into a step of preparing a metal oxide nanoparticle dispersion by dispersing metal oxide nanoparticles (step 1) in a solvent, a step of spraying the dispersion on the collector under an applied electric field to form a metal oxide thin layer on the collector (step 2), a step of thermal-compressing the metal oxide thin layer to raise a packing ratio of nanoparticles (step 3) and a step of thermal-treating the metal oxide thin layer to obtain the porous electrode active material layer to improve electrical and mechanical characteristics of the porous electrode active material layer (step 4). Here, the step 3 is an optional process to be omitted. Hereinafter, description of the fabrication method by each step will be given in detail.

Step 1

Step 1 comprises preparing a metal oxide nanoparticle dispersion, i.e., colloidal solution, by dispersing one or more types of metal oxide nanoparticles in a solvent.

The solvent is selected from the group consisting of an alcohol such as ethanol, methanol, propanol, butanol, and isopropyl alcohol (IPA), dimethylformamide (DMF), acetone, tetrahydrofuran, toluene, water, and a mixture thereof, which, however, does not limit the scope of the present invention.

Any metal oxide nanoparticle used as a negative active material or a positive active material of a secondary battery can be used.

Specifically, when preparing an anode for a secondary battery, the metal oxide is preferably selected from the group consisting of $SnO_2$, $TiO_2$, $Fe_2O_3$, $Fe_3O_4$, CoO, $CO_3O_4$, CaO, MgO, CuO, ZnO, $In_2O_3$, NiO, $MoO_3$, $WO_3$, $Li_4Ti_5O_{12}$, $SnSiO_3$, and a mixture thereof. When preparing a cathode for a secondary battery, the metal is preferably selected from the group consisting of (a) $V_2O_5$, $CuV_2O_6$, $NaMnO_2$, $NaFeO_2$, $LiCoO_2$, $LiNiO_2$, $LiNi_{1-y}CO_yO_2$ (0≤y≤0.85), $LiMn_2O_4$, $Li[Ni_{1/2}Mn_{1/2}]O_2$, $LiFePO_4$, and a mixture thereof, (b) $LiFePO_4$ doped with 1 atom % or less of one ionic moiety selected from the group consisting of $Mg^{2+}$, $Al^{3+}$, $Ti^{4+}$, $Zr^{4+}$, $Nb^{5+}$, $W^{6+}$, and a mixture thereof which occupies the lithium sites of $LiFePO_4$, and (c) a mixture of (a) and (b). Such metal oxide nanoparticles preferably have the shape of a round-grain or a rod.

It is preferable to disperse the metal oxide nanoparticles in a particle-state to the solvent. When performing an electrospray using a dispersion liquid wherein a precursor of the metal oxide is dissolved in the solvent to be present in an ion-state, the metal oxide precursors in liquid phase are coated on a collector, and, thus, there is a need for post-heating at a high temperature to form a metal oxide phase and pretty long spraying time to obtain a thick film layer of more than 5 μm. Further, a thin film obtained by electrospraying in liquid phase and the post-heating treatment has a high density and a small specific surface area, making it difficult to obtain high-capacity/high-output characteristics of a secondary battery.

There is no specific limitation of a ratio of the metal oxide nanoparticles and the solvent as long as metal oxide nanoparticles can be uniformly dispersed in the solvent. Preferably, a spraying solution where the content of metal oxide nanoparticles to the solvent is present in the range of 0.5 to 10 weight % can be prepared.

It is important to uniformly disperse metal oxide nanoparticles in a solvent for facilitating spraying. For this, as shown in FIG. 1, clumped metal oxide nanoparticles (a) in a solvent (b) can be dispersed uniformly throughout ultrasonication. Further, in case that the size of metal oxide nanoparticles to be used is in the range of 100 nm to a few μm, it is important to grind to make it fine nanoparticles. For this, as shown in FIG. 1, the size of nanoparticles can be reduced through a ball milling process and/or microbead milling process. On the other hand, the method of the present invention further comprises the step of ball milling or microbead milling the nanoparticles before the step of preparation of the metal oxide nanoparticle dispersion.

Optionally, a uniform dispersion may be prepared in the presence of an added surfactant. Such surfactant is preferably selected from the group consisting of Triton X-100 (polyethylene glycol p-(1,1,3,3-tetramethylbutyl)-phenyl ether), acetic acid, acetyltrimethyl ammonium bromide (CTAB), isopropyltris(N-aminoethyl-aminoethyl) titanate (INAAT, Ajimoto fine-techno Co., Inc.), 3-aminopropyltriethoxysilane (APTS, Aldrich, 99%), PVP (polyvinylpyrrolidone), poly(4-vinylphenol), and a mixture thereof.

In brief, in order to disperse uniformly, it is preferable to prepare a uniform dispersion by the process selected from the group consisting of milling, ultrasonication, grinding, preparing the dispersion in the presence of an added surfactant, and a combination thereof.

Step 2

Step 2 comprises spraying the metal oxide nanoparticle dispersion on the collector under an applied electric field to form a metal oxide thin layer on the collector.

An electrospray can be used as the spraying method. However, the present invention is not limited to it, and there is no specific limitation of a spraying device as long as the dispersion of nanoparticles is disposed on a collector by spraying under an applied electric field. For example, it is possible to spray by an air jet flow through an air nozzle under an electric field, and air flash-spraying is included to this.

Figure 2:
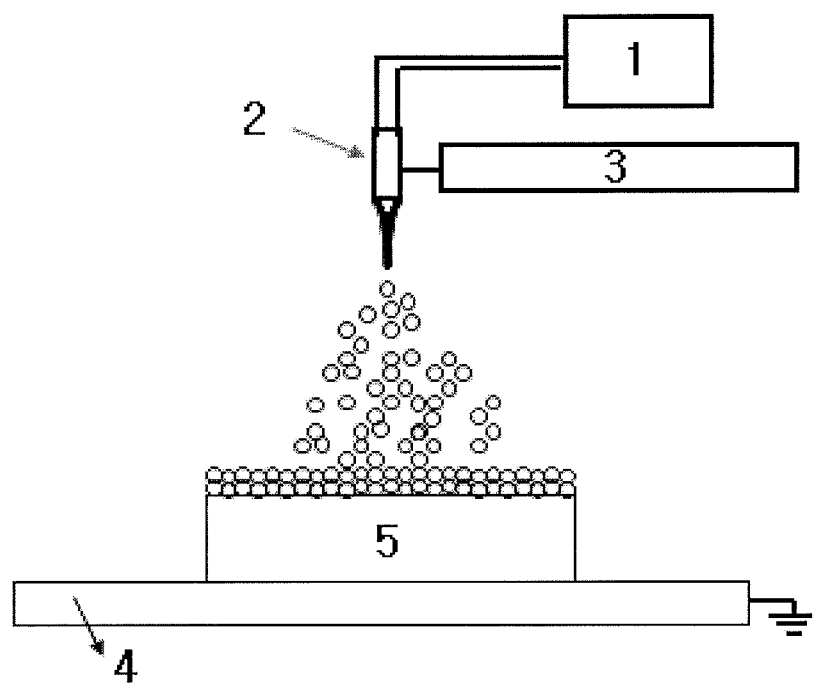
FIG. 2 is a schematic view illustrating the fabrication process of a porous electrode active material layer according to the present invention.

FIG. 2 is a schematic view of an electrospray device used to fabricate a porous electrode active material layer according to the present invention.

Referring to FIG. 2, the prepared dispersion is sprayed directly on the collector at ambient temperature. The electrospray device includes a quantitative pump (1) for injecting a fixed quantity of the dispersion, a spraying nozzle (2) connected thereto, a high voltage generator (3), and a grounded conductive substrate (4). First, a collector (5) is placed on the grounded conductive substrate (4). Here, the grounded conductive substrate (4) is used as an anode, and the spraying nozzle (2) connected to the pump to control a discharge quantity per hour is used as a cathode. The spraying on the collector is carried out until an electrode active material layer has the thickness of 0.1 to 100 μm by applying a voltage of 8 to 30 kV and controlling the solution discharge speed to 10 to 100 μl/minute.

Step 3

Step 3, which is optional, comprises performing a uniaxial press and roll-press to raise a packing density of the metal oxide thin layer obtained by the spraying and enhances the adhesion between the metal oxide thin layer and the collector.

Specifically, the collector is pressed under a pressure of 1.5 Kgf/cm$^2$ (21.34 psi, based on 1.5 ton, 10 cm×10 cm collector) using the uniaxial press and thermally compressed for 1 to 10 minutes at a temperature of 100° C. Preferably, a pressure of 0.01 to 10 MPa is applied. The pressure, temperature and time for the thermocompression can be properly selected, considering the type of metal oxide nanoparticles used. If a much higher packing ratio is obtained by the above-mentioned spraying, it is possible to perform post-heating treatment without thermocompression.

Step 4

Step 4 comprises thermal treatment of the metal oxide thin layer to obtain a porous electrode active material layer comprising aggregated metal oxide nanoparticles, metal oxide nanoparticles, or a mixture of thereof, which is thermally compressed or not thermally compressed after spraying.

Here, it is preferable to perform the thermal treatment at a temperature of 100 to 500° C.

Further, the post-heating treatment is divided into a dry process at a low temperature performed at a temperature of 100 to 300° C. to thoroughly remove a solvent which can be remained on a collector after spraying, and a thermal treatment at a high temperature performed at a temperature of 300 to 500° C. to increase the bond between metal oxide nanoparticles and the adhesion with a lower collector, and improve an electrical characteristics through nanoparticles growth. Both of the dry process at a low temperature and the thermal treatment at a high temperature may be performed sequentially or selectively.

The post-heating treatment can improve the adhesion between the metal oxide thin layer and the collector, and easily adjust the distribution and the size of nanoparticle to enhance thermal, electrical and mechanical stabilities of a thin metal oxide layer. Especially, ZnO can improve electrical conductive characteristics depending on the condition of a thermal treatment atmosphere (thermal treatment under a partial pressure of $O_2$ and $Ar/N_2$ reduction atmosphere).

Since the electrode fabricated by the fabrication method contains a thin layer comprising aggregated metal oxide nanoparticles, metal oxide nanoparticles, or a mixture thereof as an active material layer, the electrode can have a highly increased specific surface area to exhibit improved electrical conductive characteristics, also have a porous structure to greatly endure to volume change according to intercalation and deintercalation of lithium ions or alloying/dealloying process. Accordingly, it is possible to undergo stable high speed charging/discharging cycles under a high-energy-density and high-current condition, to maintain high-capacity/high-output characteristics and to improve high-output characteristics of a secondary battery comprising the electrode.

Accordingly, the present invention provides the secondary battery comprising the electrode fabricated by the fabrication method.

The secondary battery may include a lead storage battery, a nickel cadmium, a nickel hydrogen storage battery, a lithium secondary battery, and a lithium ion polymer battery.

In general, a secondary battery is composed of an electrode, an electrolyte, a separator, a case, a terminal, and others, and other constitutions than the electrode of the secondary battery of the present invention are identical to those of a general secondary battery.

The fabrication method of the electrode according to the present invention makes it possible to, by fabricating a thin active material layer containing aggregated metal oxide nanoparticles, metal oxide nanoparticles or a mixture thereof on a collector through an electrostatic spray, greatly enhance the adhesion between the collector and the active material layer. Accordingly, an electrode for a secondary battery having high electrical and mechanical stabilities at ambient temperature can be fabricated. Since the thickness of the electrode active material layer is also easily adjustable by controlling the spraying time at the step of spraying, it is possible to apply to a secondary battery with a thick film as well as a thin film. Especially, by spraying at least two types of metal oxide nanoparticles at the same time to form a porous layer, a secondary battery having various characteristics depending on the desired specification can be easily fabricated.

Further, the fabrication method of the electrode of the present invention can greatly improve the electrical, thermal and mechanical stabilities by performing a simple post-heating treatment after spraying.

In addition, by optionally more performing a thermal compression after spraying of a metal oxide nanoparticle dispersion containing nanoparticles, the packing density of electrode active material nanoparticles is raised, thereby minimizing a capacity decay with the cycle number commonly observed in the electrode active material, and the volume change during repeated charging/discharging reactions is minimized, thereby obtaining long-lasting high current output. Especially, an electrode for a lithium secondary battery having high stability during repeated charging/discharging cycles can be fabricated.

Since the electrode according to the present invention fabricated by the method comprises a thin layer comprising aggregated metal oxide nanoparticles, metal oxide nanoparticles, or a mixture thereof as an active material layer, the electrode can have a highly increased specific surface area to exhibit improved electrical conductive characteristics, also have a porous structure to greatly endure to a volume change according to intercalation and deintercalation of lithium ions, or alloying/dealloying process, which is capable of undergoing stable high speed charging/discharging cycles under a high-energy-density and high-current condition, and enhancing high-capacity/high-output characteristics of a secondary battery comprising the electrode.

The following preparative examples and examples illustrate the embodiments of the present invention in more detail. However, the following preparative examples and examples of the present invention are merely examples, and the present invention is not limited thereto.

PREPARATIVE EXAMPLE 1

Fabrication of an Electrode Comprising a Thin Layer of Tin Oxide Nanoparticles 0.4 g of tin oxide ($SnO_2$) nanoparticles (Aldrich Co., the diameter of the nanoparticles: at most 100 nm) was mixed with 10 ml of ethanol, and the mixture was subjected to an ultrasonic treatment for 30 minutes to prepare a dispersion. The dispersion was transferred into a syringe, mounted on an electrospray device, a voltage was applied between the tip of the end of the syringe and a stainless steel substrate disposed in an appropriate position of the electrospray device to form a thin electrode layer of tin oxide nanoparticles. In this procedure, the voltage was 12 kV, the spray rate was 30 μl/min, and the distance between the tip and the substrate was 10 cm.

Figure 3A:
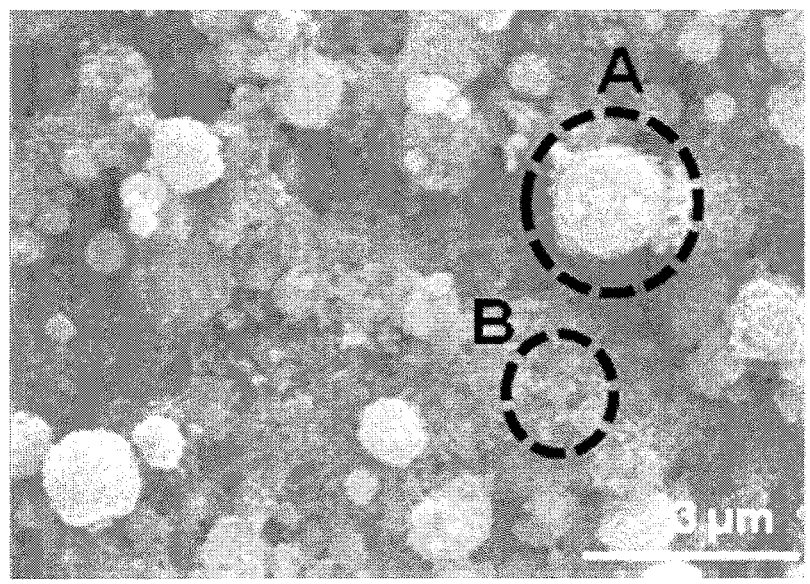
FIGS. 3a to 3d are a scanning electron microscope (SEM) image of the thin layer of tin oxide nanoparticles of Preparative Example 1 and an enlarged view thereof, respectively.
Figure 3B:
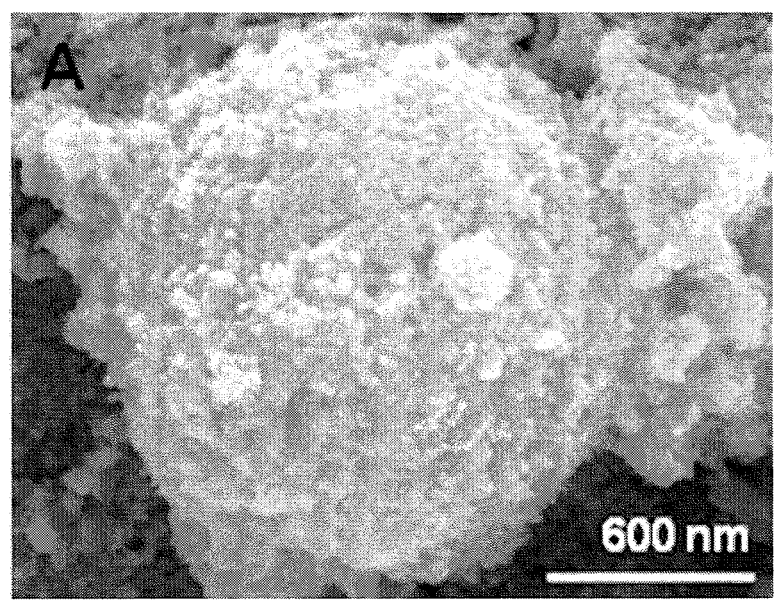
Figure 3C:
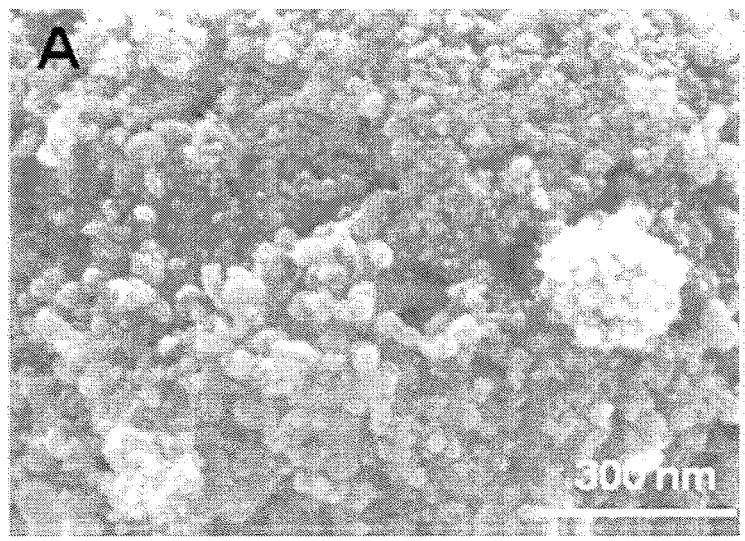

A thin layer of tin oxide nanoparticles of the fabricated electrode was observed by scanning electron microscope (SEM), and the results are shown in FIGS. 3a to 3c.

FIG. 3a shows that the thin layer of tin oxide nanoparticles are clumped together to form agglomerates having the size of 300 nm to 1.5 μm (region A) as well as a region (region B) where nanoparticles uniformly formed a thin layer without agglomerating.

Figure 3D:
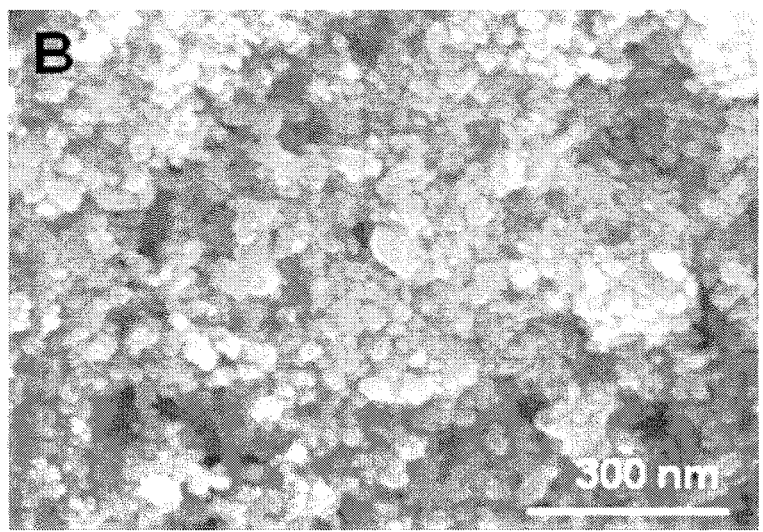

FIG. 3b, an enlarged image of the nanoparticle agglomerates distributed into the region A of FIG. 3a, shows that the size of the agglomerate is about 1.5 μm. FIG. 3c is an enlarged SEM image of FIG. 3b, showing that the agglomerate is composed of fine nanoparticles. FIG. 3d is an enlarged image of the thin layer of nanoparticles distributed region B of FIG. 3a, showing that the layer is composed of fine nanoparticles, similar to the image of FIG. 3c. Thus, regardless whether the agglomeration of nanoparticles occurs during the spraying process, the thin layer of nanoparticles formed thereby is composed of fine nanoparticles, which confer on the resulting thin tin oxide layer a high specific surface area and a plurality of fine pores. These characteristics are responsible for minimizing the stress during charging/discharging cycles.

PREPARATIVE EXAMPLE 2

Fabrication of an Electrode Comprising a Thin Layer of Zinc Oxide Nanoparticles

An electrode comprising a thin layer of zinc oxide (ZnO) nanoparticles was fabricated using the same procedure as described in Preparative Example 1 except using zinc oxide nanoparticles (Aldrich Co., the average diameter of the nanoparticles: at most 200 nm).

Figure 4A:
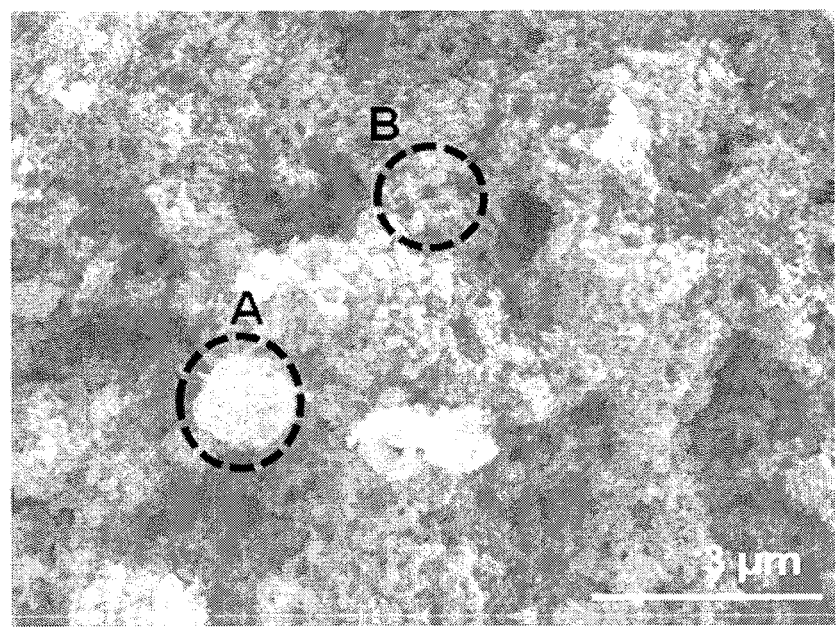
FIGS. 4a and 4b are an SEM image of the thin layer of zinc oxide nanoparticles obtained in Preparative Example 2 and an enlarged view thereof.
Figure 4B:
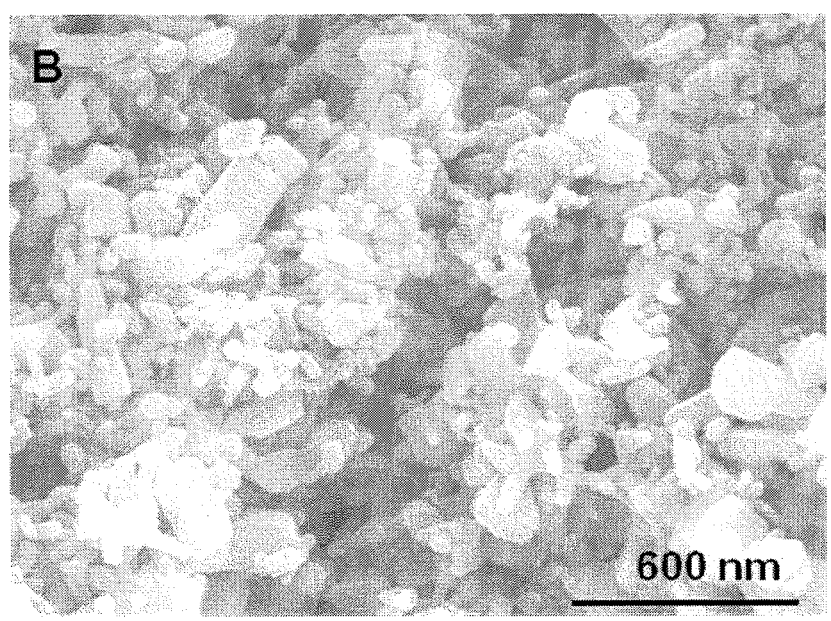

A thin layer of zinc oxide nanoparticles of the fabricated electrode was observed by SEM, and the results are shown in FIGS. 4a and 4b.

FIG. 4a shows that the thin layer of zinc oxide nanoparticles are clumped together to form agglomerates having the size of 300 nm to 1.5 μm (region A) as well as a region (region B) where nanoparticles uniformly formed a thin layer without agglomerating.

FIG. 4b, an enlarged image of the thin layer of nanoparticles distributed into the region B of FIG. 4a, shows that the layer is composed of fine nanoparticles having the size of 20 nm to 200 nm.

PREPARATIVE EXAMPLE 3

Fabrication of an Electrode Comprising a Thin Layer of Iron Oxide Nanoparticles

An electrode comprising a thin layer of iron oxide ($Fe_2O_3$) nanoparticles was fabricated using the same procedure as described in Preparative Example 1 except using iron oxide nanoparticles (Aldrich Co., the average diameter of the nanoparticles: at most 100 nm).

Figure 5A:
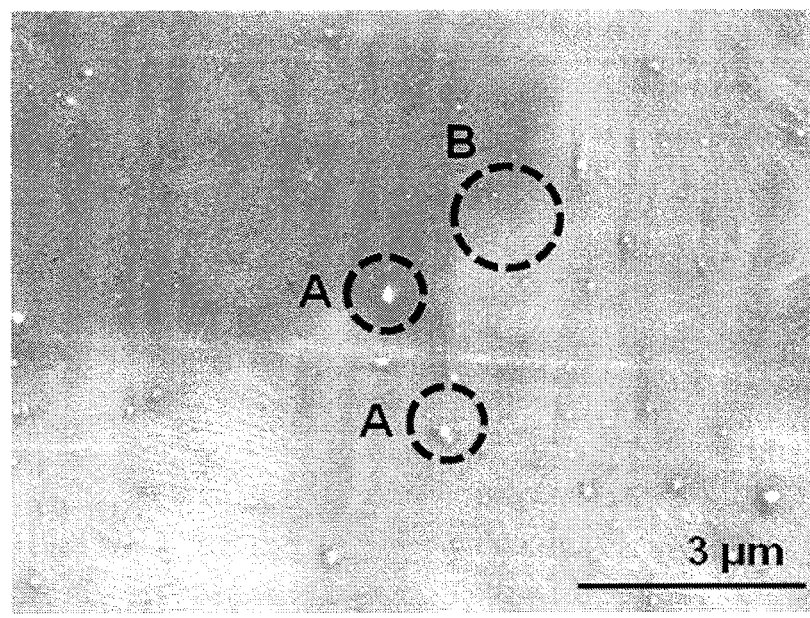
FIGS. 5a and 5b are an SEM image of the thin layer of iron oxide nanoparticles of an electrode according to Preparative Example 3 and an enlarged view thereof, respectively.
Figure 5B:
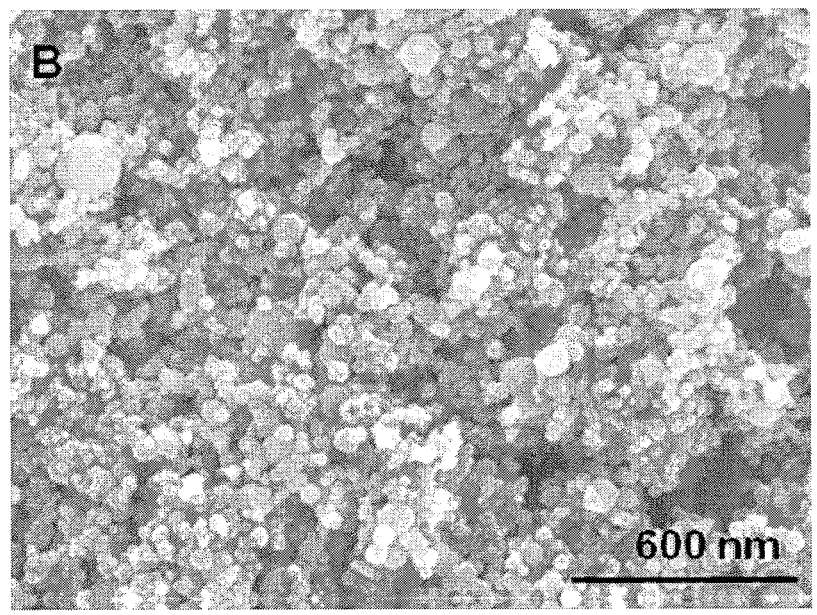

A thin layer of iron oxide nanoparticles of the fabricated electrode was observed by SEM, and the results are shown in FIGS. 5a and 5b.

An SEM image of the thin layer of iron oxide nanoparticles obtained by electrospraying was shown in FIG. 5a.

FIG. 5a shows that the thin layer of iron oxide nanoparticles uniformly forms a thin layer disposed in the wide region of the collector. It comprises a region (region A) of an SEM image in FIG. 5a where nanoparticles clumped together to form agglomerates as well as a region (region B) where nanoparticles uniformly formed a thin layer without agglomerating.

FIG. 5b, an enlarged image of the thin layer of nanoparticles distributed into the region B of FIG. 5a, shows that the layer is composed of fine nanoparticles having the size of 20 nm to 100 nm.

EXAMPLE 1

Fabrication of an Electrode Comprising a Thin Layer of Tin Oxide Nanoparticles

The thin layer of tin oxide nanoparticles prepared on the collector in Preparative Example 1 was post-heated at 500° C. to fabricate an electrode according to the present invention. Here, post-heating treatment was carried out in an air atmosphere for 30 minutes by using a box furnace.

A thin layer of tin oxide nanoparticles obtained in Example 1 was observed by SEM. The results are shown in FIGS. 6a and 6b.

Figure 6A:
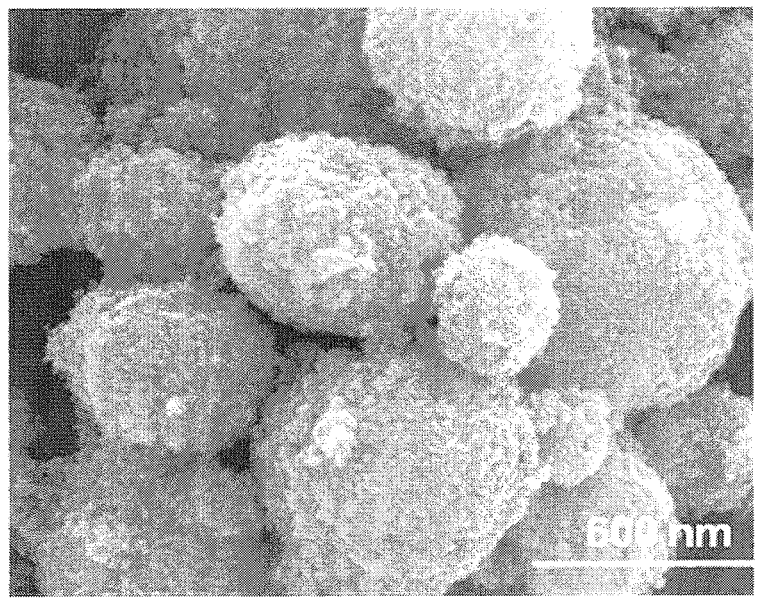
FIGS. 6a and 6b are an SEM image of the thin layer of tin oxide nanoparticles obtained in Example 1 and an enlarged view thereof, respectively.

FIG. 6a shows a crystalline growth of tin oxide nanoparticles after thermal treatment and the grown particle having the size of 300 nm to 2 nm. Further, a bond between particles becomes stronger, thereby being expected to have improved characteristics in terms of an electrical conduction. Especially, the internal resistance of a negative active material can be reduced thus to be expected to have high-output characteristics of a secondary battery anode. Further, the grown particles are composed of fine nanoparticles, still maintaining a high specific surface area.

Figure 6B:
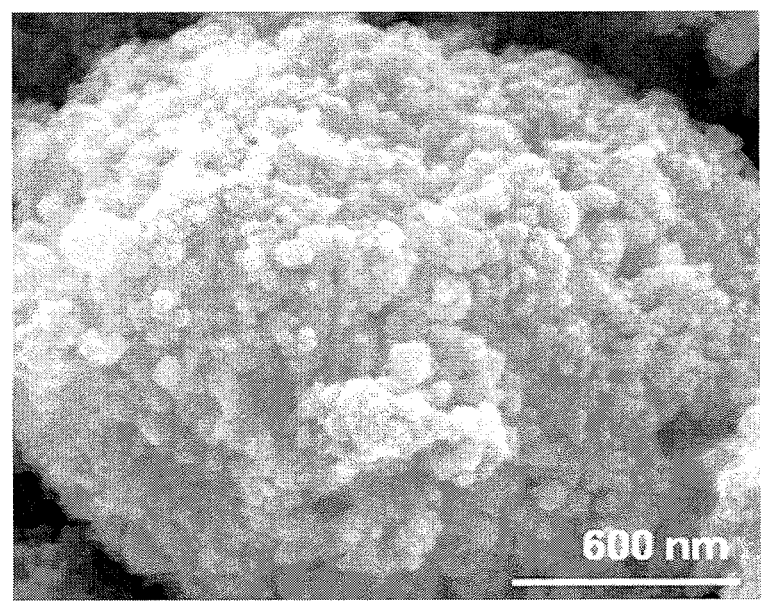

FIG. 6b, an enlarged image of FIG. 6a, shows that the size of tin oxide nanoparticle had become bigger than the tin oxide nanoparticles formed without thermal treatment. In addition, the post-heating treatment can improve adhesion characteristics between the thin layer obtained through spraying process at ambient temperature and the collector.

EXAMPLE 2

Fabrication of an Electrode Comprising a Thin Layer of Zinc Oxide Nanoparticles

The thin layer of zinc oxide nanoparticles prepared on a collector in Preparative Example 2 was post-heated at 500° C. to fabricate an electrode according to the present invention. Here, post-heating treatment was carried out in an air atmosphere for 30 minutes by using a box furnace.

A thin layer of zinc oxide nanoparticles obtained in Example 2 was observed by SEM. The result was shown in FIG. 7.

Figure 7:
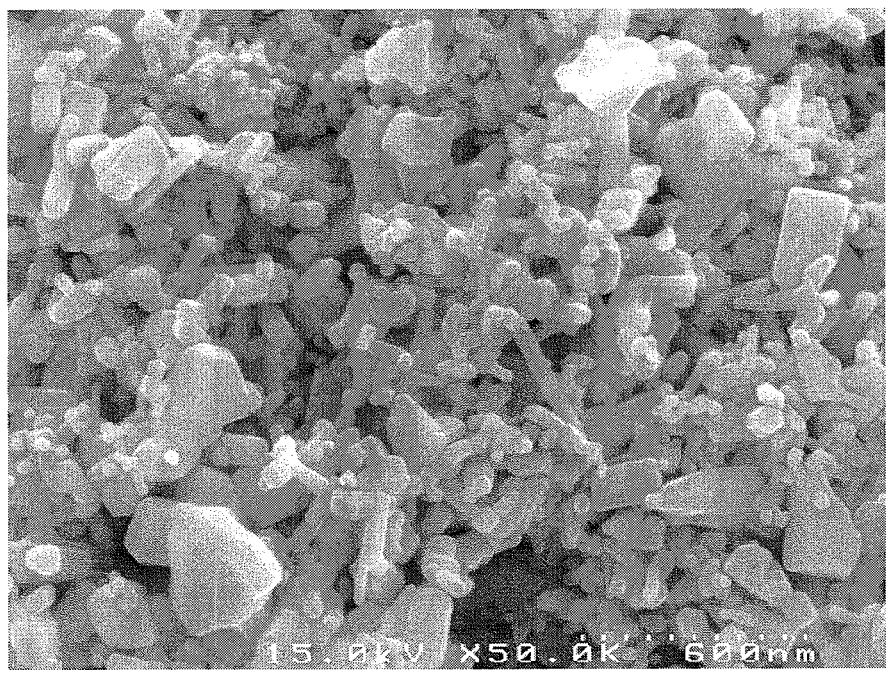
FIG. 7 is an SEM image of the thin layer of zinc oxide nanoparticles obtained in Example 2.

FIG. 7 shows a weak crystalline growth of zinc oxide after thermal treatment and a strong bond between particles, thereby being expected to have improved characteristics in terms of an electrical conduction. Especially, grown particles are also composed of fine nanoparticles, which cause a high specific surface area.

EXPERIMENTAL EXAMPLE 1

Evaluation of Current-Voltage Characteristics

To identify the electrical conductive characteristics of the thin layer of tin oxide nanoparticles of an electrode fabricated according to the present invention, current-voltage characteristics was evaluated as described below.

First, an electrode containing a thin layer of tin oxide comprising fine nanoparticles was fabricated using the same procedure as described in Example 1 except using Au(150 nm)/Ti(50 nm)/alumina($Al_2O_3$) substrates [Au/Ti composes an interdigital electrode (finger's width: 200 nm, fingers' distance: 200 nm, finger's length: 8 mm, finger pairs: 7)] instead of stainless steel substrates as a collector.

Meanwhile, an electrode containing a thin layer of tin oxide comprising fine nanoparticles was fabricated using the same procedure as described in Preparative Example 1 except using Au(150 nm)/Ti(50 nm)/alumina($Al_2O_3$) substrates [Au/Ti composes an interdigital electrode (finger's width: 200 μm, fingers' distance: 200 nm, finger's length: 8 mm, finger pairs: 7)] instead of stainless steel substrates as a collector, and used as an electrode of Comparative Example.

The change in the current was measured with an applied voltage on the fabricated electrodes from −20 V to +20 V by using Agilent B1500 device. The results are shown in FIGS. 8 and 9.

Figure 8:
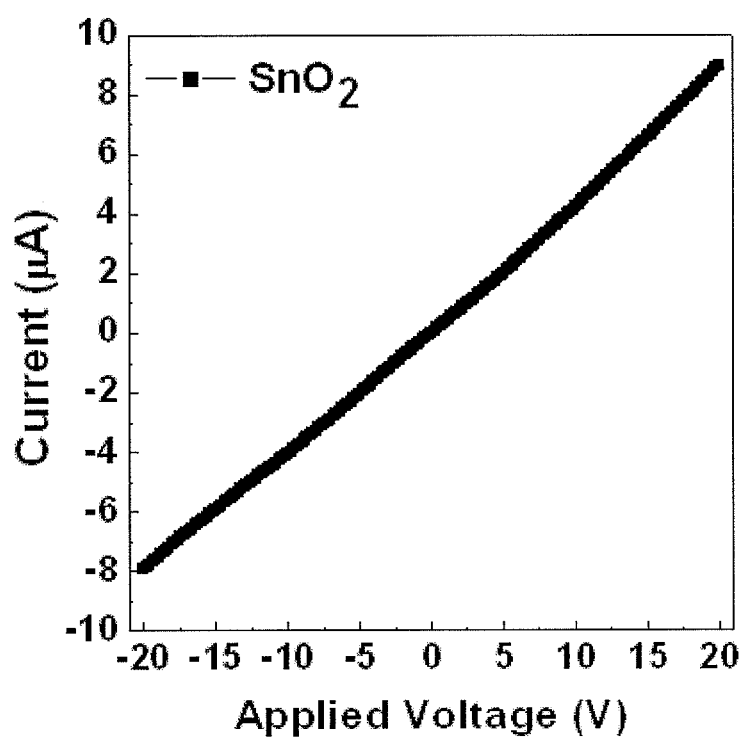
FIG. 8 is a current-voltage graph of the electrode comprising a thin layer of tin oxide nanoparticles fabricated in Preparative Example 1 (Comparative Example).
Figure 9:
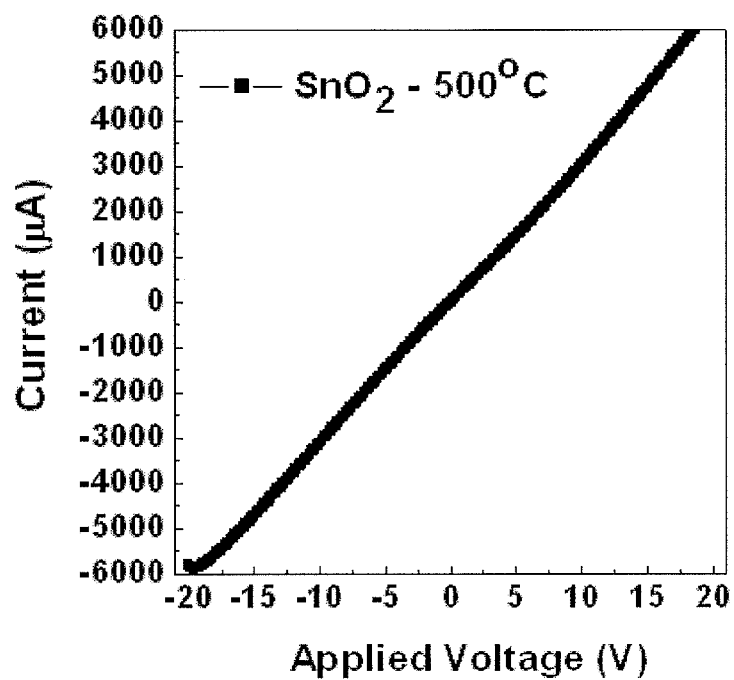
FIG. 9 is a current-voltage graph of the electrode of Example comprising a thin layer of tin oxide nanoparticles fabricated according to the present invention.

FIG. 8 is a current-voltage (I-V) graph of the electrode fabricated in Comparative Example, and FIG. 9 is a current-voltage (I-V) graph of the electrode comprising the thin layer of tin oxide nanoparticles fabricated according to the present invention.

As shown in FIGS. 8 and 9, while the electrode comprising the thin layer of nanoparticles fabricated only by spraying without thermal treatment as a Comparative Example showed 4 μA of current flow at the 10 V of voltage showing a typical semiconductor characteristics, the electrode comprising a thin layer of nanoparticles fabricated by the method of the present invention showed 3000 μA of current flow at the 10 V of voltage showing 70-fold higher electrical conductive characteristics than the electrode without thermal treatment of Comparative Example. The reason for such result is that the thermal treatment of an electrode according to the present invention at a high temperature of 500° C. facilitates the growth of nanoparticles and the adhesion between particles, thereby improving electrical characteristics. A secondary battery negative active material having improved high-speed and high-output characteristics can be expected from the improvement of the electrical conductive characteristics.

EXPERIMENTAL EXAMPLE 2

Evaluation of Characteristics of a Lithium Secondary Battery

A lithium secondary battery of a coin cell (CR2032-type coin cell) structure comprising an electrode fabricated by the method of the present invention was fabricated, and electrical characteristics were evaluated as described below.

Specifically, in the cell structure, an EC/DEC (1/1 volume %) solution in which 1M of $LiPF_6$ was dissolved was used as the electrolyte. For an anode to be used as a reference electrode and a counter electrode, a metal lithium foil (Foote Mineral Co.) of a degree of purity of 99% was used, and for a working electrode, an electrode obtained in Example 1 was used. As the separator for preventing electrical shorting between the anode and cathode, a polypropylene film (Celgard Inc.) was used, and such cell was fabricated under an Ar atmosphere in a glove box made by VAC Co.

The experimental equipment used here for charging/discharging cycles was a Model WBCS3000 made by WonATech Co., and the voltage change under a constant current was observed by an MPS (Multi Potentiostat System), which can measure 16 channels using 16 boards at the same time. The intensity of the current density used during charging/discharging cycles was based on 2 C-rate. For the thin layer of tin oxide nanoparticles, the cut-off voltage was 0.1 to 1.1 V.

Figure 10:
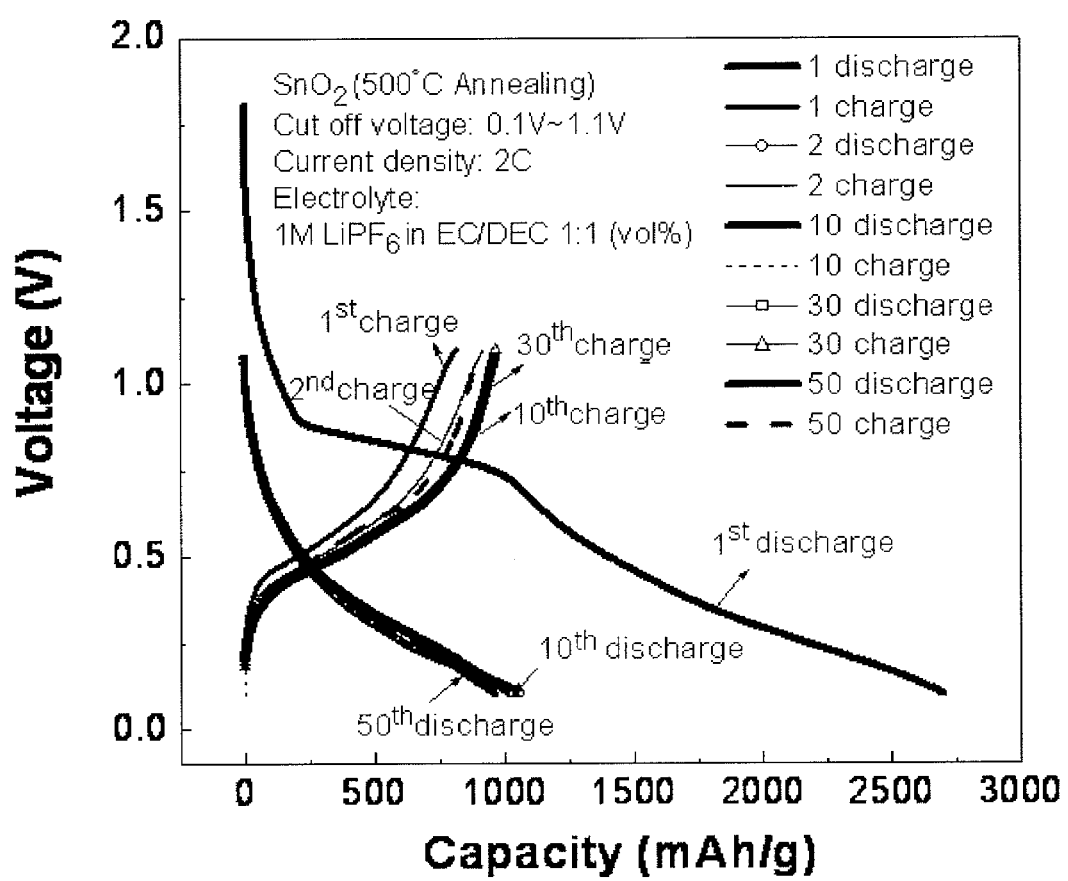
FIG. 10 illustrates the change in the discharge capacity characteristics with the cycle number of the lithium secondary battery comprising a thin layer of tin oxide nanoparticles fabricated according to the present invention.

FIG. 10 illustrates the change in the discharge capacity with the cycle number of the lithium secondary battery comprising an electrode of the present invention, showing the results measured at 2 C.

FIG. 10 shows that the initial discharge capacity value was a high value of 2700 mAh/g, and the discharge capacity value was reduced to 1000 mAh/g by $Li_2O$ formed after the first reaction. It was noted that the value of discharge capacity was maintained at 1000 mAh/g between $10^{th}$ and $50^{th}$ cycle without a dramatic change. The thin layer of tin oxide thermally treated at 500° C. after electrospraying showed very excellent electrical conductive characteristics in Experimental Example 1. This is the reason why a high capacity is maintained even at high rate characteristics of 2 C, and high-output characteristics are shown till the $50^{th}$ cycle without reduction. Accordingly, it is noted that the thin layer of tin oxide nanoparticles fabricated through post-heating treatment can be used as anode materials for the secondary battery of a high output as well as a high capacity.

Meanwhile, a lithium secondary battery was prepared using the same procedure as described in the above except using an electrode fabricated by the method of Preparative Example 1 as Comparative Example, and the change in the discharge capacity with the number of cycles of the fabricated lithium secondary battery was measured. The intensity of the current density used during charging/discharging cycles was based on 0.5 C-rate by calculating the theoretical capacity of each material. For the thin layer of tin oxide nanoparticles, the cut-off voltage was 0.1 to 1.1 V.

Figure 11:
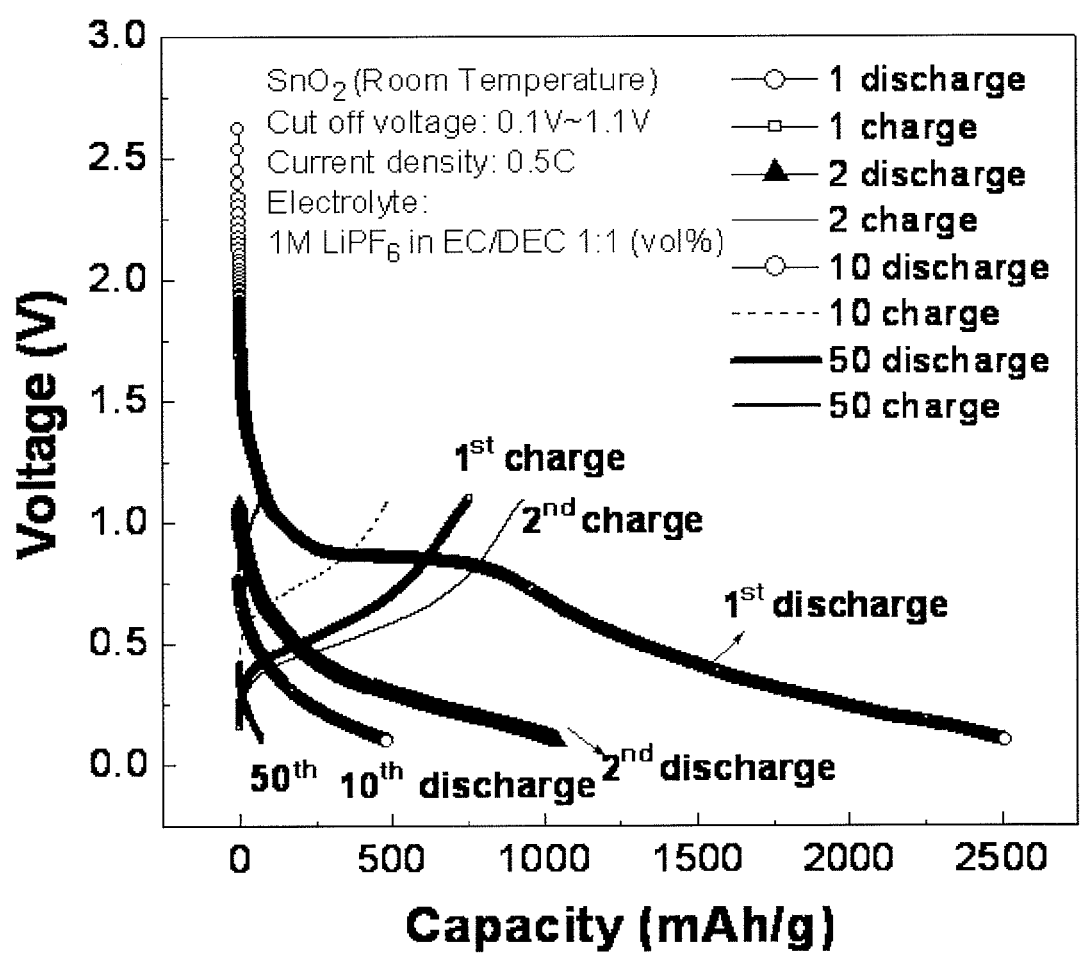
FIG. 11 illustrates the change in the discharge capacity characteristics with the cycle number of the lithium secondary battery comprising a thin layer of tin oxide nanoparticles fabricated in Preparative Example 1 (Comparative Example).

FIG. 11 illustrates the change in the discharge capacity with the cycle number of the lithium secondary battery comprising an electrode fabricated in Preparative Example 1 as Comparative Example, showing the result measured at 0.5 C.

FIG. 11 shows that the initial discharge capacity value was a high value of 2500 mAh/g, and the discharge capacity value was reduced to 1100 mAh/g by $Li_2O$ formed after the first reaction. The discharge capacity was more reduced after $10^{th}$ and $50^{th}$ cycle, and, thus, was reduced to 500 mAh/g in the $10^{th}$ cycle and 30 mAh/g in the $50^{th}$ cycle. The C-rate is defined as the current flowing when the capacity is completely discharged within 1 hour. Accordingly, it is said that the higher the C-rate, the higher the level of the maximum current which can be momentarily outputted. This can be a very important factor for an electric power source for electronic and mechanical devices which require a high momentary output. Such capacity reduction with the number of cycles causes the electrical conduction to reduce because the bond between residual solvent and particles on the thin layer of nanoparticles fabricated without post-heating treatment after electrospraying is not formed perfectly, and, thus, high-output characteristics are not observed.

While the invention has been described with respect to the above specific embodiments, it should be recognized that various modifications and changes may be made to the invention by those skilled in the art which also fall within the scope of the invention as defined by the appended claims.

What is claimed is:

1. An electrode for a secondary battery, the electrode comprising:
   a collector; and
   metal oxide nanoparticles on the collector that form a porous electrode active layer, wherein the metal oxide nanoparticles comprise CaO nanoparticles.

2. The electrode for a secondary battery of claim 1, wherein the average diameter of the metal oxide nanoparticles is between 2 nm to 2 μm.

3. The electrode for a secondary battery of claim 1, wherein the metal oxide nanoparticles further comprise metal oxide nanoparticles selected the group consisting of $Fe_3O_4$ nanoparticles, CoO nanoparticles, CuO nanoparticles, MgO nanoparticles, ZnO nanoparticles, $WO_3$ nanoparticles, $SnSiO_3$ nanoparticles, and mixtures thereof.

4. The electrode for a secondary battery of claim 1, wherein the metal oxide nanoparticles further comprise $WO_3$ nanoparticles.

5. The electrode for a secondary battery of claim 1, wherein the collector is made of material selected from the group consisting of Pt, Au, Pd, Ir, Ag, Rh, Ru, Ni, stainless steel, Al, Mo, Cr, Cu, Ti, W, ITO (In doped $SnO_2$), FTO (F doped $SnO_2$), and a silicon wafer.

6. A fabrication method of the electrode for a secondary battery, the method comprising the steps of:
   milling nanoparticles to form one or more types of metal oxide nanoparticles in which milling comprises either ball milling or microbead milling;
   preparing a metal oxide nanoparticle dispersion by ultrasonically dispersing the one or more types of metal oxide nanoparticles in a solvent, wherein the step of milling is performed before the step of preparing the metal oxide nanoparticle dispersion;
   spraying the metal oxide nanoparticle dispersion on the collector under an applied electric field to form a metal oxide thin layer on the collector;
   thermal-compressing the metal oxide thin layer before thermal-treating; and
   thermal-treating the metal oxide thin layer to obtain the porous electrode that comprise the metal oxide nanoparticles.

7. The method of claim 6, wherein the average diameter of the metal oxide nanoparticles is between 2 nm to 2 μm.

8. The method of claim 6, wherein the solvent is selected from the group consisting of ethanol, methanol, propanol, butanol, isopropyl alcohol, dimethyl formamide, acetone, tetrahydrofuran, toluene, water, and a mixture thereof.

9. The method of claim 6, wherein the metal oxide is selected from the group consisting of $SnO_2$, $TiO_2$, $Fe_2O_3$, $Fe_3O_4$, CoO, $Co_3O_4$, CaO, MgO, CuO, ZnO, $In_2O_3$, NiO, $MoO_3$, $WO_3$, $Li_4Ti_5O_{12}$, $SnSiO_3$, and a mixture thereof.

10. The method of claim 6, wherein the metal oxide is selected from the group consisting of (a) $V_2O_5$, $CuV_2O_6$, $NaMnO_2$, $NaFeO_2$, $LiCoO_2$, $LiNiO_2$, $LiNi_{1-y}Co_yO_2$ ($0 \leq y \leq 0.85$), $LiMn_2O_4$, $Li[Ni_{1/2}Mn_{1/2}]O_2$, $LiFePO_4$, and a mixture thereof, (b) $LiFePO_4$ doped with 1 atom % or less of at least one selected from the group consisting $Mg^{2+}$, $Al^{3+}$, $Ti^{4+}$, $Zr^{4+}$, $Nb^{5+}$, $W^{6+}$ which occupy the lithium sites of $LiFePO_4$, and (c) a mixture of (a) and (b).

11. The method of claim 6, wherein the step of preparing the metal oxide nanoparticle dispersion comprises the process of preparing the dispersion in the presence of an added surfactant, wherein the surfactant is selected from the group consisting of polyethylene glycol ρ-(1,1,3,3-tetramethylbutyl)-phenyl ether, acetic acid, cetyltrimethyl ammonium bromide, isopropyltris(N-aminoethyl-aminoethyl) titanate, 3-aminopropyltriethoxysilane, polyvinylpyrrolidone, poly(4-vinylphenol), and a mixture thereof.

12. The method of claim 6, further comprising the step of milling nanoparticles to form metal oxide nanoparticles comprises microbead milling.

13. The method of claim 6, wherein the step of spraying is performed by electrospraying or air flash-spraying.

14. The method of claim 6, wherein the step of thermal-treating is performed at a temperature of 100 to 500° C.

15. The method of claim 6, wherein the metal oxide nanoparticles are anodic CoO nanoparticles.

16. The method of claim 6, wherein the metal oxide nanoparticles are cathodic CuO nanoparticles.

17. The method of claim 6, wherein the electrode is a cathode and the metal oxide nanoparticles are selected from the group consisting of $Fe_3O_4$, CoO, $Co_3O_4$, CaO, CuO, MgO, ZnO, $WO_3$, and mixtures thereof.

18. The method of claim 6, wherein the electrode is an anode and the metal oxide nanoparticles $LiFePO_4$ doped with 1 atom % or less of at least one selected from the group consisting of $Mg^{2+}$, $Al^{3+}$, $Ti^{4+}$, $Zr^{4+}$, $Nb^{5+}$, and $W^{6+}$ which occupy the lithium sites of $LiFePO_4$.

* * * * *